3,332,507
CONTROL FOR A VEHICLE
Thomas H. Bush, Battle Creek, Mich., assignor to Clark
Equipment Company, a corporation of Michigan
Filed Dec. 28, 1964, Ser. No. 421,353
9 Claims. (Cl. 180—6.28)

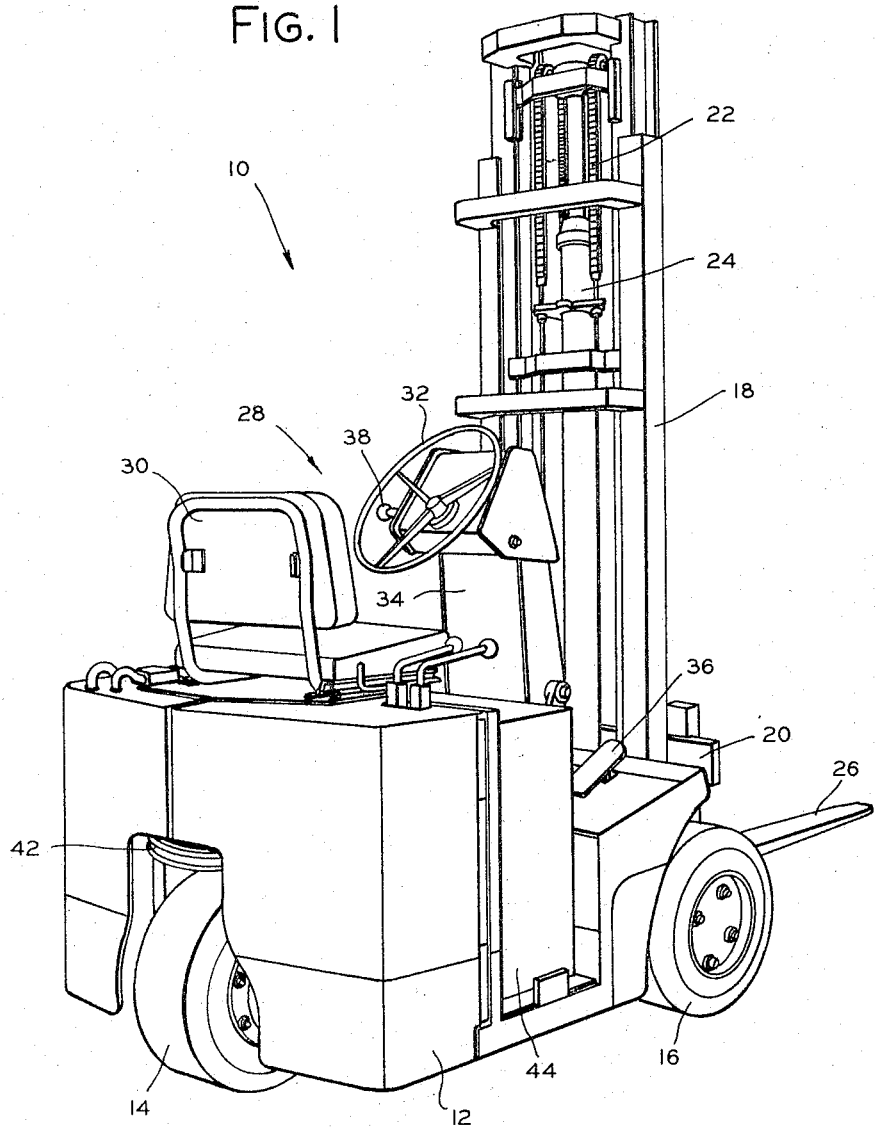

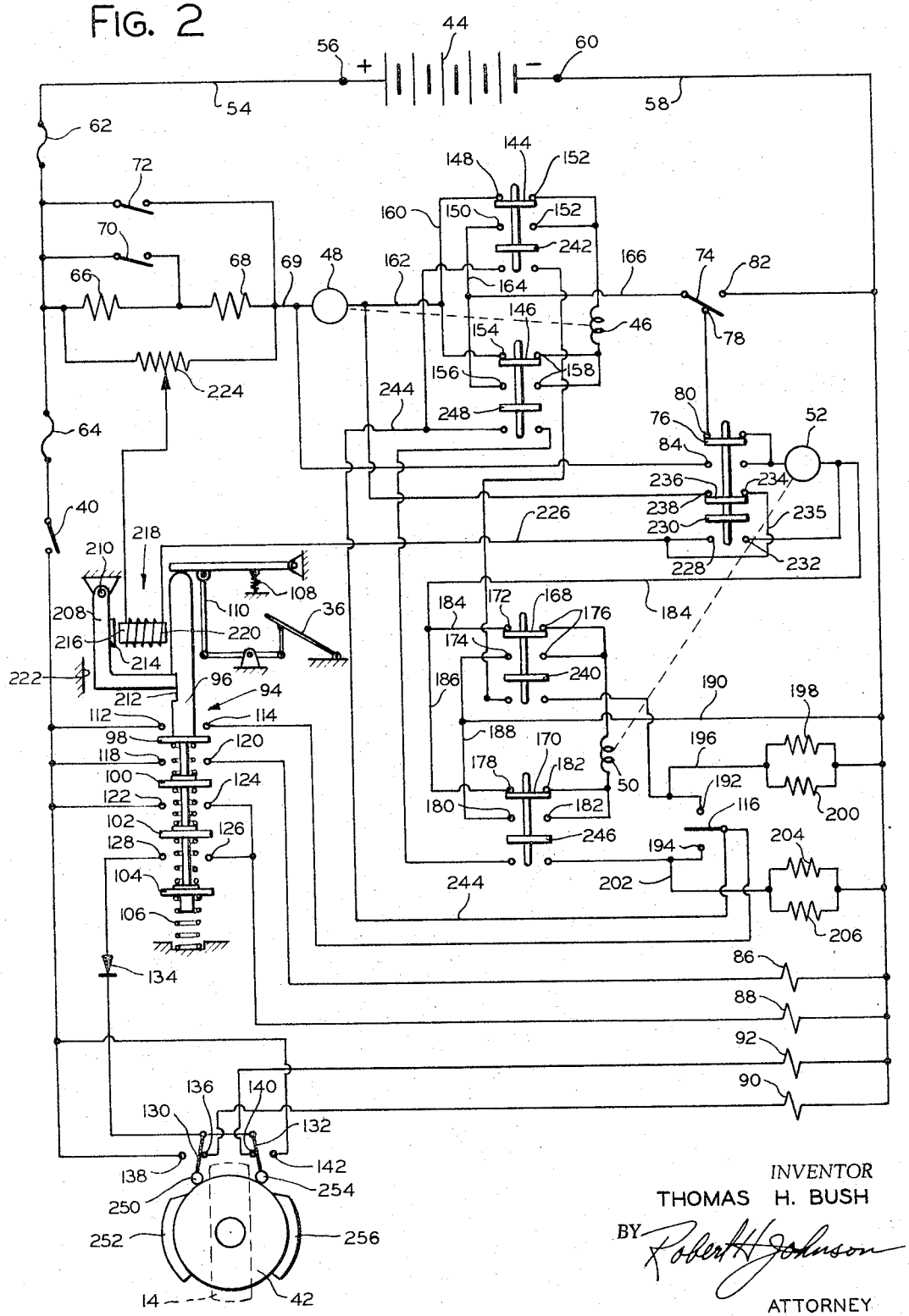

This invention relates to controls for a vehicle, and more specifically to drive controls for a vehicle having two separate drive trains interconnected by the controls.

It is a principal object of my invention to provide improved control means for a vehicle having a pair of drive wheels driven by separate drive motors.

Another object of my invention is to provide in a vehicle having a pair of electric motors and selective means for connecting the motors for series or parallel operation, improved control means interconnected with the selective means for de-energizing the motor connected to the drive wheel on the inside of a turn having less than a predetermined radius.

Another object of my invention is to provide in a vehicle having a pair of drive motors and anti-plugging means for the motors which is responsive to the direction of current flow through one of the motors, means for rendering the anti-plugging means responsive to the direction of current flow through the other of the motors.

In carrying out my invention in a preferred embodiment, I provide in a vehicle having first and second electric drive motors, selective means for connecting the motors for series or parallel operation. There is provided also anti-plugging means responsive to the direction of current flow through the first motor for preventing plugging of the motors. Interconnected with the selective means is means for de-energizing the drive motor connected to the inside drive wheel during a turn having less than a pre-determined radius. Also interconnected with the selective means is means for rendering the anti-plugging means responsive to the direction of current flow through the second motor.

The above and other objects, features and advantages of my invention will be more readily understood by persons skilled in the art when the following detailed description is taken in conjunction with the accompanying drawing wherein:

FIGURE 1 shows a rear quarter isometric view of a lift truck embodying my invention; and FIGURE 2 shows schematically the controls and circuitry for controlling the drive motors of the truck shown in FIG. 1.

Referring to FIG. 1, reference numeral 10 denotes generally an electric industrial lift truck which is suitable for use with my invention. Truck 10 includes a body 12 which is supported by a non-powered rear dirigible wheel 14 and a pair of non-steering front drive wheels 16, only one of which can be seen. Connected to truck 10 and mounted forwardly of drive wheels 16 is a conventional lift upright 18 which includes a carriage 20 that is elevatable therein through a sprocket and chain arrangement 22 that is actuated by a fluid motor 24. Mounted on carriage 20 is a load engaging means which in the present case is a pair of fork arms 26, only one of which can be seen.

Truck 10 also is provided with an operator's station 28 which is located on body 12, as shown, and includes a seat 30. Various controls are located adjacent station 28 and include a steering control wheel 32 mounted on a pedestal 34, an accelerator foot pedal 36, a forward and reverse control handle 38 which actuates a direction control switch 116 and an on-off key switch 40 (FIG. 2) which is mounted on pedestal 34 adjacent control handle 38. Steering control wheel 32 is connected to dirigible wheel 14 by means of suitable linkage which includes a drum 42 that is connected to dirigible wheel 14 so that a pivotal movement of drum 42 about a vertical steering axis causes pivotal movement of wheel 14 about the same axis.

Truck 10 has a pair of electric drive motors connected to different ones of wheels 16 and powered by a battery 44 which is carried by body 12 and disposed partially below seat 30.

Referring now to FIG. 2, the controls and circuitry for operating the two drive motors will be described. First, however, it should be mentioned that one of the drive motors includes a field coil 46 and an armature 48 which is connected to the left front drive wheel, not shown, and the other of the drive motors includes a field coil 50 and an armature 52 connected to the right front drive wheel 16.

Turning briefly to the circuitry, the circuitry includes a conductor 54 which is connected to a first or positive terminal 56 of battery 44 and a conductor 58 which is connected to a second or negative terminal 60 of battery 44. It will be noted that conductor 54 connects in series, as shown, a 400 ampere capacity fuse 62, a 14 ampere capacity fuse 64 and on-off key switch 40.

The motor controls include mechanism for varying the speed of the motors by connecting the motors in series with varying resistance or connecting them in parallel, mechanism for reversing the direction of rotation of the motors by changing the direction of current flow through the respective field coils 46 and 50, mechanism for preventing plugging of the motors above first motor speed, (that is, the motors 46, 48 and 50, 52 cannot be energized for driving truck 10 above first speed in one direction while truck 10 is still coasting in the opposite direction). Mechanism for rendering the plugging preventative or anti-plugging mechanism responsive to the direction of current flow through either the first or the second motor armatures and mechanism for de-energizing the motor connected to the inside wheel during a turn having less than a predetermined radius.

The mechanism for varying the drive motor speed includes a pair of resistances 66 and 68 connected in series between armature 48 and conductor 54 by a conductor 69, a pair of normally open relay actuated switches 70 and 72 arranged to bypass resistances 66 and 68, respectively, and a pair of paralleling switches 74 and 76. Switch 74 includes a normally closed contact 78 which is connected to a normally closed contact 80 of switch 76. Switch 74 also includes a normally open contact 82 which is connected to conductor 58. Also, switch 76 includes a normally open contact 84 which is connected to conductor 69.

Switches 70, 72, 74 and 76 are all actuated by relays. That is, energization of relays 86 and 88 causes switches 70 and 72, respectively, to close. Energization of relay 90 actuates switch 74 to open contact 78 and close contact 82. Similarly, energization of relay 92 actuates switch 76 to open contact 80 and close contact 84. Relays 86–92 are all connected at one of their ends to conductor 58 and connectible at the other of their ends to motor speed controller 94.

Motor speed controller 94 includes a plunger 96 which carries four normally open switches 98, 100, 102 and 104 which are mounted on plunger 96 so that they may be closed sequentially. That is, first switch 98 closes, then switch 100 closes followed by switch 102 and then switch 104.

Plunger 96 is biased in a direction which tends to close switches 98–104 by a compression spring 106; however, the force of spring 106 normally is overcome by a tension spring 108 which is connected to an accelerator linkage 110 that abuts one end of plunger 96 and also is connected to accelerator foot pedal 36 so that when pedal 36 is depressed linkage 110 moves away from the end of plunger 96 and permits plunger 96 to move in a direction closing one or more of switches 98–104, depending upon the extent to which it is allowed to move.

Switch 98 includes a contact 112 which is connected to conductor 54 and a contact 114 which is connected to a direction control switch 116, as shown. Switch 100 includes a contact 118 connected to conductor 54 and a contact 120 to which relay 86 is connected so that when switch 100 is closed relay 86 is energized. Similarly, switch 102 includes a contact 122 connected to conductor 54 and a contact 124 to which relay 88 is connected so that when switch 102 is closed relay 88 is energized. Switch 104 includes a contact 126 which is connected in circuit with contact 124 and a contact 128. Contact 128 is connected in circuit, as shown, with a pair of motor cut-out switches 130 and 132. It will be noted that a diode 134 is disposed in the circuit between contact 128 and switches 130 and 132 and serves to permit current flow only from contact 128 toward switches 130 and 132. For present purposes it is sufficient to say that switch 130 has normally closed contact 136 which is connected to relay 90 and a normally open contact 138 which is connected to conductor 54. Likewise, switch 132 has a normally closed contact 140 connected to relay 92 and a normally open contact 142 connected to conductor 54. The purpose of switches 130 and 132 will be explained in further detail hereinafter. At this point, however, it should be noted that when switch 104 is closed relays 90 and 92 which are connected in parallel circuit when switches 130 and 132 are in the positions shown will be energized. As was mentioned above, energization of relays 90 and 92 actuate switches 74 and 76 so as to condition the drive motors for parallel operation.

The mechanism for reversing motor 46, 48 includes a pair of reversing switches 144 and 146. Switch 144 includes a normally closed contact 148 and a normally open contact 150. These contacts are arranged to be connected alternatively with one end of field coil 46 through contacts 152. Similarly, switch 146 includes a normally closed contact 154 and a normally open contact 156, which contacts are connectible alternatively to the other end of field coil 46 through a pair of contacts 158. Normally closed contacts 148 and 154 are connected in circuit by means of a conductor 160 which is connected to armature 48 by means of a conductor 162. Also, normally open contacts 150 and 156 are connected by a conductor 164 which is connected to paralleling switch 74 by a conductor 166.

The mechanism for reversing motor 50, 52, like motor 46, 48, includes a pair of reversing switches 168 and 170. Switch 168 includes a normally closed contact 172 and a normally open contact 174, both contacts being connectible alternatively to one end of field coil 50 through a pair of contacts 176. Likewise, switch 170 includes a normally closed contact 178 and a normally open contact 180, both contacts being connectible alternatively to the other end of coil 50 by means of a pair of contacts 182. Normally closed contacts 172 and 178 are connected to armature 52 by means of conductors 184 and 186. Similarly, normally open contacts 174 and 180 are connected by a conductor 188 which is connected to conductor 58 by means of a conductor 190.

Returning now to direction control switch 116, is includes a pair of contacts 192 and 194. Contact 192 is connected by means of a conductor 196, a pair of relays 198 and 200 which are connected in parallel with each other and are connected to conductor 58. Relay 198, when energized, actuates switch 144 to open contact 148 and close contact 150 and relay 200 serves, when energized, to open contact 172 and close contact 174 of switch 168. Contact 194 of switch 116 is connected by means of a conductor 202 to a pair of relays 204 and 206 which are connected in parallel with each other and connected to conductor 58. Relay 204 functions, when energized, to acuate switch 146 to open contact 154 and close contact 156. Also, relay 206 functions, when energized, to actuate switch 170 so as to open contact 178 and close contact 180.

At this point it will be understood that when power is supplied to direction control switch 116 and it is actuated to close contact 192 that relays 198 and 200 will be energized to actuate switches 144 and 168 to close contacts 150 and 174, respectively. With the reversing switches in this condition coil 46 will be connected in series with armature 48 and coil 50 will be connected in series with armature 52. Further, the direction of current flow through coils 46 and 50 will be the same and such that the motors 46, 48 and 50, 52 will drive truck 10 in a forward direction. On the other hand, if direction control switch 116 is actuated to close contact 194, then relays 204 and 206 will be energized with the result that switches 146 and 170 will be actuated to close contacts 156 and 180, respectively. In this case the field coils and armatures of the respective motors will again be connected in series, but the direction of current flow through the field coils will be reversed so that the motors will be conditioned to drive truck 10 in a reverse direction.

The mechanism for preventing energization of the drive motors for driving the truck in one direction above the first speed when the truck is still traveling in the opposite direction includes a latch or latch member 208 which is pivotally mounted adjacent plunger 96 at 210. Latch 208 is pivotal between a position in which it engages a notch 212 in plunger 96 and a position out of engagement with notch 212. When latch 208 is in engagement with notch 212, the movement of plunger 96 is limited so that only switch 98 can be closed. Thus, motor speed controller 94 can be actuated only to condition the drive motors for operation in first speed when latch 208 is in engagement with notch 212.

Latch 208 is held in the position engaging notch 212 by means of a permanent magnet 214 attached to latch 208, as shown. Magnet 214 is disposed closely adjacent one end of the iron core 216 of an electromagnet 218 which also includes a coil 220. Because of the proximity of core 216 permanent magnet 214 is attracted toward it, and thus tends to pivot latch 208 to the position in which it engages notch 212.

As will be explained in more detail shortly, coil 220 is arranged so that when a current passes through it in one direction the electromagnet 218 and permanent magnet 214 attract each other and when a current is passed through coil 220 in the opposite direction electromagnet 218 and permanent magnet 214 repel each other, whereby latch 208 is actuated to the position out of engagement with notch 212 and against a stop 222.

One end of coil 220 of electromagnet 218 is connected to an adjustable resistance 224 which is connected in parallel with resistances 66 and 68. The function of resistance 224 is to regulate the amount of current flow through coil 220 at a proper level. The other end of coil 220 is connected by means of a conductor 226 to a contact 228 of a normally open switch 230, switch 230 including another contact 232 which is connected to conductor 184. Also, conductor 226 is connected via a conductor to a contact 234 of a normally closed switch 236 which includes another contact 238 that is connected to conductor 162.

When switch 230 is open and switch 236 is closed, then coil 220 of electromagnet 218 is connected in parallel with armature 48 so that the direction of current flow through coil 220 is the same as the direction of current flow through armature 48. When switch 230 is closed and switch 236 is open, coil 220 of electromagnet 218 is connected in parallel with armature 52 so that the direction of current flow through coil 220 is the same as the direction of current flow through armature 52.

Switches 230 and 236 are connected to paralleling switch 76 for conjoint actuation so that when relay 92 is energized to actuate switch 76 to open contact 80 and close contact 84, switch 230 is actuated to close and switch 236 is actuated to open.

At this point it will be appreciated that switches 230 and 236 and the circuitry connected therewith provide means for rendering electromagnet 218 responsive to the direction of current flow through either armature 48 or armature 52, depending upon whether or not relay 92 is energized.

The anti-plugging mechanism also includes a pair of normally open forward hold-in switches 240 and 242 connected in series circuit between conductor 196 and another conductor 244 which is connected to switch 116, as shown. Similarly, two normally open reverse hold-in switches 246 and 248 are connected in series circuit between conductor 202 and conductor 244. Forward hold-in switches 240 and 242 are connected to reversing switches 168 and 144, respectively, for conjoint actuation therewith. In a like manner, reverse hold-in switches 246 and 248 are connected to reversing switches 170 and 146, respectively, for conjoint actuation therewith.

The hold-in switches and associated circuitry just above-described serve to prevent energization of the drive motors in a reverse direction, unless the motors are first completely de-energized, as will be more completely described in the description of operation.

The mechanism for de-energizing the drive motor connected to the inside wheel during a turn having less than a predetermined radius includes cut-out switches 130 and 132 which were mentioned previously and which are interconnected with paralleling switches 74 and 76 through relays 90 and 92. Further in this regard, switch 130 is provided with a cam follower 250 which cooperates with a cam 252 mounted on drum 42. Likewise, switch 132 is provided with a cam follower 254 which cooperates with another cam 256 mounted on drum 42. Cam follower 250 and cam 252 cooperate so that when dirigible wheel 14 is pivoted approximately 30° away from the longitudinal axis of truck 10 in a clockwise direction, as viewed in FIG. 2, switch 130 is actuated to open contact 136 and close contact 138. As a result relay 92 is energized so that paralleling switch 76 is actuated to open contact 80 and close contact 84. Also, the circuit to relay 90 is opened so that relay 90 cannot be energized. The net result is that motor 46, 48 is de-energized while motor 50, 52 remains energized. Pivotal movement of wheel 14 approximately 30° away from the longitudinal axis of truck 10 in a counterclockwise direction causes cam follower 254 to cooperate with cam 256 to actuate switch 132 to open contact 140 and close contact 142, whereby relay 90 is energized and the circuit to relay 92 is opened so that it cannot be energized. As a result paralleling switch 74 is actuated to open contact 78 and close contact 82 so that motor 50, 52 is de-energized and motor 46, 48 remains energized.

In order to enable one to more readily understand my invention, I will now explain the operation of the above-described controls and circuitry. For the purpose of description, it will be assumed that on-off key switch 40 is closed throughout the remainder of description of operation. Further, it will be assumed that the remainder of the controls are initially disposed as shown in FIG. 2 which can be termed the neutral position of the controls.

Now, it will be assumed that an operator wishes to drive truck 10 forwardly and progressively accelerate from the first drive motor speed to the highest drive motor speed. In order to accomplish this operation the operator should first manipulate direction control handle 38 to actuate direction control switch 116 to close contact 192. The operator then should depress accelerator foot pedal 36 to allow plunger 96 to move upwardly, as shown in FIG. 2. Because notch 212 is larger than latch 208, plunger 96 can move far enough to close switch 98. This closes the circuit through relays 198 and 200, thereby actuating reversing switches 144 and 168 to close contacts 150 and 174, respectively. When these contacts are closed the two drive motors are connected in series circuit with resistances 66 and 68 and will operate at their lowest speed. Completion of the series circuit through the drive motors also completes the circuit through coil 220 of electromagnet 218. Under this condition of motor operation the direction of current flow is such that electromagnet 218 repels permanent magnet 214, whereby latch 208 is pivoted out of engagement with notch 212. Thus, further movement of plunger 96 is permitted.

Now, upon further depression of accelerator 36 plunger 96 is permitted to move further upwardly so that next switch 100 closes, switch 98 remaining closed. Closure of switch 100 completes the circuit through relay 86 which actuates by pass switch 70 to close so that resistance 66 is by-passed. As a consequence, the drive motors will now operate at the next higher or second speed.

Continued upward movement of plunger 96 next causes switch 102 to close, both switches 98 and 100 remaining closed. Closure of switch 102 energizes relay 88 which actuates by-pass switch 72 to close, whereby resistance 68, as well as resistor 66, is taken out of the series circuit with the two drive motors. This provides the next higher or third motor speed.

Finally, upon further movement of plunger 96, switch 104 is closed, switches 98, 100 and 102 remaining closed, with the result that relays 90 and 92 are energized. Energization of relays 90 and 92 actuates paralleling switches 74 and 76 so that contacts 82 and 84 are closed, whereby the drive motors are connected in parallel which results in the next higher or fourth motor speed.

Because both drive wheels 16 of truck 10 are driven by separate drive motors, they tend to be driven at the same speed when truck 10 is negotiating a turn with the result that the inside wheel on the turn will tend to "scrub," that is, be driven faster than it can turn, and so skid somewhat resulting in undesirable tire wear. So long as dirigible wheel 14 is not turned more than 30° in either direction from the longitudinal axis of the truck the amount of "scrubbing" is not objectionable; however, when the dirigible wheel is turned more than 30° in either direction from the longitudinal axis of the truck, then it is desirable to be able to de-energize the drive motor connected to the inside wheel on the turn to thus eliminate "scrubbing." This is accomplished through actuation of one or the other of paralleling switches 74 and 76.

Assume that truck 10 is being driven forwardly in first speed, that is, switch 116 is actuated to close contact 192 and only switch 98 of motor speed controller 94 is closed, and it is desired to negotiate a turn to the right which involves pivoting dirigible wheel in a counterclockwise direction more than 30° from the longitudinal axis of truck 10. When dirigible wheel 14 is pivoted sufficiently far enough to actuate switch 132 to open contact 140 and close contact 142, relay 90 will be energized and the circuit to relay 92 will be open so that it cannot be energized. As a result, paralleling switch 74 will be actuated to open contact 78 and close contact 82, whereby motor 46, 48 is connected in series circuit with resistors 66 and 68 between conductors 54 and 58. Also, the circuit through motor 50, 52 is opened so that it is de-energized. Consequently, the drive wheel which is on the inside of the right turn is permitted to run free. Pivotal movement of dirigible wheel 14 in an opposite or clockwise direction more than 30° from the longitudinal axis of the truck in order to execute a left turn actuates switch 130 so that contact 136 is opened and contact 138 is closed with the result that relay 92 is energized and the circuit to relay 90 is opened so that relay 90 cannot be energized. Consequently, paralleling switch 76 is actuated to open contact 80 and close contact 84 with the result that motor 50, 52 is connected in series circuit with resistances 66 and 68 between conductors 54 and 58 and the circuit through motor 46, 48 is opened so that this motor is de-energized.

At this point it will be appreciated that the mechanism for de-energizing the drive motor connected to the wheel on the inside of a turn when dirigible wheel 14 is moved approximately 30° away from the longitudinal truck axis also will function when both drive motors are connected in parallel rather than series circuit since actuation of switch 132 always energizes relay 90 and opens the circuit to relay 92 so that relay 92 cannot be energized and actuation of switch 130 always acts to energize relay 92 and opens the circuit to relay 90 so that relay 90 cannot be energized. Thus, when the drive motors are connected in parallel circuit for fourth speed operation, actuation of either cut-out switches 130 and 132 de-energizes the appropriate one of the drive motors.

The use of cut-out switches 130 and 132 to de-energize the drive motor connected to the wheel on the inside of a turn having less than a predetermined radius in order to prevent "scrubbing" also has a further advantage. When dirigible wheel 14 is pivoted sufficiently far enough, approximately 90° from the longitudinal axis of truck 10, then truck 10 will pivot about a point substantially midway between the front drive wheels, at which time one of the drive wheels will be rotating in one direction and the other of the drive wheels will be rotating in the opposite direction.

Assuming now that the operator is driving the truck 10 forwardly in second speed, in which condition of operation switch 116 will be actuated to close contact 192 and switches 98 and 100 will be closed, and that he, in order to reverse the direction of travel of truck 10, actuates switch 116 to open contact 192 and close contact 194, but does not release accelerator pedal 36 with the result that switches 98 and 100 remain closed. Because switch 98 remains closed the forward hold-in circuit, which includes conductor 244 and switches 242 and 240, keeps relays 198 and 200 energized. As a result switches 144 and 168 continue to be actuated to connect the drive motors for forward drive. When contact 194 is closed relays 204 and 206 are energized which serve to actuate reversing switches 146 and 170 which normally serve to condition the drive motors for reverse drive. Also, the reverse hold-in circuit which includes conductor 244 and switches 246 and 248 is closed. Consequently, both motors are de-energized and cannot be re-energized until switch 98 is opened. Thus, the operator must release accelerator foot pedal 36 until switch 98 opens, at which time plunger 96 is substantially in the position shown in FIG. 2. When switch 98 is open the relays 198–206 are de-energized. Now, if the truck is continuing to coast in the direction in which it was previously traveling, there is a current flow through coil 220 which is the reverse of the normal current flow through the coil when motor 46, 48 is energized by battery 44. Consequently, the electromagnet 218 attracts magnet 214 and holds latch 208 in notch 212, whereby plunger 96 can be moved only far enough to close switch 98. Assuming now that the operator depresses accelerator foot pedal 36 after having released it completely, the two drive motors are connected in series circuit with resistances 66 and 68 across battery 44 to drive in opposite direction since contact 194 of switch 116 is now closed. The result is that plugging of the drive motors is permitted in first drive speed. As the drive motors begin to drive, the direction of current flow through coil 220 is reversed and builds up sufficiently so that electromagent 218 repels magnet 214 and latch 208 moves out of engagement with notch 212 so that the drive motors can then be accelerated through the remaining speeds.

Coil 220 of electromagnet 218 is arranged to be connected in parallel with either armature 48 or armature 52 through by means of normally open switch 230 and normally closed switch 236, both of which are connected to paralleling switch 76 for conjoint actuation therewith, as described previously. This arrangement is necessary so that the anti-plugging mechanism will function whether both drive motors are energized or only one or the other of the drive motors is energized. Thus, in a situation where only drive motor 46, 48 is energized paralleling switch 74 is actuated so that contact 78 is opened and contact 82 is closed. Thus, current will flow through armature 48 and the anti-plugging mechanism, in order to be effective, must be responsive to the current flow through armature 48 such is the case since switch 236 is closed, thereby placing coil 220 in parallel circuit with armature 48. Now, should only motor 50, 52 be energized, then paralleling switch 76 is actuated to open contact 80 and close contact 84. At the same time switch 236 is opened and switch 230 is closed with the result that coil 220 is reconnected in parallel circuit with armature 52, and therefore the anti-plugging means is responsive to the direction of current flow through armature 52 of the energized motor.

Although only one embodiment of my invention has been described herein, this disclosure is merely for purposes of illustration and not as a limitation of the scope of the invention. It is therefore to be expressly understood that the invention is not limited to the specific embodiment shown, but may be used in various other ways, and that various modifications may be made to suit other requirements and that other changes, substitutions, additions and omissions may be made in the construction, arrangement and manner of operation of the parts without necessarily departing from the scope of the invention as defined in the following claims.

I claim:
1. In a vehicle, first and second electric motors, motor speed control means for operating said motors at a plurality of speeds, said control means including selective means for connecting said motors for series or parallel operation, said selective means including first switch means with a first position for series operation of said motors and a second position for parallel operation of said motors, anti-plugging means responsive to the direction of current flow through the armature of said first motor for preventing plugging of said motors above the first control speed, and means for rendering said anti-plugging means responsive to the direction of current flow through the armature of said second motor, said rendering means including second switch means operatively connected to said first switch means for connecting said anti-plugging means in parallel circuit only with said first motor armature when said first switch means is in said first position and connecting said anti-plugging means in parallel circuit only with said second motor armature when said first switch means is in said second position.

2. In a vehicle, first and second electric motors, motor speed control means for operating said motors at a plurality of speeds, said control means including selective means for connecting said motors for series or parallel operation, anti-plugging means responsive to the direction of current flow through said first motor for preventing plugging of said motors above the first control speed when said motors are connected for series operation and means interconnected with said selective means for rendering said anti-plugging means responsive to the direction of current flow through said second motor when said motors are connected for parallel operation.

3. In a vehicle, first and second electric motors, motor speed control means for operating said motors at a plurality of speeds, said control means including selective means for connecting said motors in series or parallel circuit with each other, means responsive to the direction of current flow through said first motor for preventing plugging of said motors when said motors are connected in series circuit, and means for rendering said plugging prevention means responsive to the direction of current flow through said second motor when said motors are connected in parallel circuit.

4. In a vehicle having a dirigible wheel and a pair of drive wheels, first and second electric motors drivingly connected to different ones of the drive wheels, motor speed control means for operating said motors at a plurality of speeds, said control means including selective means for connecting said motors for series or parallel operation, anti-plugging means responsive to the direction of current flow through one of said motors for preventing plugging of said motors when said motors are connected for series or parallel operation, means responsive to the disposition of the dirigible wheel and interconnected with said selective means for de-energizing only the motor connected to the inside drive wheel during a turn having less than a predetermined radius, and means interconnected with said selective means for rendering said anti-plugging means responsive to the direction of current flow through the energized motor during a turn having less than a predetermined radius.

5. In a vehicle having a dirigible wheel and a pair of drive wheels, first and second electric motors drivingly connected to different ones of the drive wheels, motor speed control means operatively connected to said motors for operating said motors at a plurality of speeds, said control means including selective means for connecting said motors for series or parallel operation, said selective means including first switch means having a first position for series operation of said motors and a second position for parallel operation of said motors and second switch means connected in circuit with said first switch means and having a first position for series operation of said motors and a second position for parallel operation of said motors, anti-plugging means responsive to the direction of current flow through the armature of said first motor for preventing plugging of said motors, said anti-plugging means including electromagnet means, means responsive to the disposition of the dirigible wheel for de-energizing only the motor connected to the inside drive wheel during a turn having less than a predetermined radius, said de-energizing means including means for actuating said first switch means to its second position when the dirigible wheel is disposed for a turn of less than a predetermined radius in one direction and actuating said second switch means to its second position when the dirigible wheel is disposed for a turn of less than a predetermined radius in the opposite direction, and means for rendering said anti-plugging means responsive to the direction of current flow through the armature of said second motor, said last-mentioned means including third switch means having an operative position for connecting said electromagnet means in parallel circuit with said first motor armature and an inoperative position and fourth switch means having an operative position for connecting said electromagnet means in parallel circuit with said second motor armature and an inoperative position, said third and fourth switch means being connected to said second switch means for conjoint actuation therewith so that said third switch means is in its operative position and said fourth switch means is in its inoperative position when said second switch means is in its first position and vice versa when said second switch means is in its second position.

6. In a vehicle having at least a dirigible wheel and a pair of drive wheels, first and second motor means drivingly connected to different ones of the drive wheels, selective means for connecting said motor means for series or parallel operation, and means responsive to the disposition of the dirigible wheel for de-energizing only the motor means connected to the drive wheel on the inside of a turn whether said motor means are initially connected for series or parallel operation.

7. In a vehicle having at least a dirigible wheel and a pair of drive wheels, first and second motor means drivingly connected to different ones of the drive wheels, selective means for connecting said motor means for series operation or parallel operation, and means responsive to the disposition of the dirigible wheel and interconnected with the said selective means for de-energizing the motor means on the inside of a turn when said motor means are connected initially for series operation.

8. In a vehicle having a dirigible wheel and a pair of drive wheels, first and second electric motors drivingly connected to different ones of the drive wheels, selective means for connecting said motors for series or parallel operation, and means responsive to the disposition of the dirigible wheel and interconnected with said selective means for de-energizing only the motor connected to the inside drive wheel during a turn having less than a predetermined radius regardless of whether said motors were connected initially for series or parallel operation.

9. In a vehicle having a dirigible wheel and a pair of drive wheels, first and second electric motors drivingly connected to different ones of the drive wheels, selective means for connecting said motors for series or parallel operation, said selective means including first switch means normally disposed in a first position and actuatable to a second position, second switch means normally disposed in a third position and actuatable to a fourth position, first relay means energizable to actuate said first switch means to said second position and second relay means energizable to actuate said second switch means to said fourth position, said switch means being connected in circuit so that said motors are connected for series operation when said switch means are in said first and third positions and are connected for parallel operation when said switch means are in said second and fourth positions, and means responsive to the disposition of the dirigible wheel and interconnected with said selective means for de-energizing only the motor connected to the wheel on the inside of a turn having less than a predetermined radius, said de-energizing means including third switch means normally disposed in a fifth position and actuatable in response to the disposition of the dirigible wheel for a turn in one direction of less than a predetermined radius to a sixth position and fourth switch means normally disposed in a seventh position and actuatable in response to the disposition of the dirigible wheel for a turn in the opposite direction of less than a predetermined radius to an eighth position, said third and fourth switch means being connected in circuit with each other and said relay means so that both relay means are energizable when said third and fourth switch means are in said fifth and seventh positions, said first relay means is energized and said second relay means cannot be energized when said third switch means is in said sixth position and said fourth switch means is in said seventh position and said second relay means is energized and said first relay means cannot be energized when said third switch means is in said fifth position and said fourth switch means is in said eighth position.

References Cited
UNITED STATES PATENTS

| | | | |
|---|---|---|---|
| 665,322 | 1/1901 | Garrett et al. | 318—95 |
| 2,419,178 | 4/1947 | Strong | 318—111 X |
| 2,467,785 | 4/1949 | Strong | 318—383 X |
| 2,571,180 | 10/1951 | Ball et al. | 180—6.28 |
| 2,732,022 | 1/1956 | Lapsley et al. | 180—6.28 |

BENJAMIN HERSH, *Primary Examiner.*

J. A. PEKAR, *Assistant Examiner.*